(12) United States Patent
Knee (10) Patent No.: US 9,877,022 B2
(45) Date of Patent: Jan. 23, 2018

(54) VIDEO SEQUENCE PROCESSING OF PIXEL-TO-PIXEL DISSIMILARITY VALUES

(71) Applicant: Snell Limited, Reading, Berkshire (GB)

(72) Inventor: Michael James Knee, Petersfield (GB)

(73) Assignee: Snell Limited, Reading (GB)

(*) Notice: Subject to any disclaimer, the term of this patent is extended or adjusted under 35 U.S.C. 154(b) by 77 days.

(21) Appl. No.: 14/245,326

(22) Filed: Apr. 4, 2014

(65) Prior Publication Data

US 2014/0301468 A1 Oct. 9, 2014

(30) Foreign Application Priority Data

Apr. 8, 2013 (GB) .................................. 1306340.9

(51) Int. Cl.
*H04N 19/117* (2014.01)
*H04N 19/176* (2014.01)
(Continued)

(52) U.S. Cl.
CPC .......... *H04N 19/117* (2014.11); *H04N 19/14* (2014.11); *H04N 19/176* (2014.11); *H04N 19/182* (2014.11); *H04N 19/82* (2014.11)

(58) Field of Classification Search
CPC .... H04N 19/176; H04N 19/117; H04N 19/14; H04N 19/182; H04N 19/82; H04N 5/23212; H04N 5/3696; H04N 7/0157; H04N 5/21; H04N 19/80; H04N 19/527; H04N 19/513; H04N 19/51; H04N 19/85; H04N 19/86; H04N 17/004; H04N 19/186; H04N 19/33; H04N 7/012; H04N 5/144; H04N 5/44; G06K 9/00758; G06T 2207/10004; G06T 7/0069; G06T 7/0026; G06T 2207/10148; G06T 7/2066;
(Continued)

(56) References Cited

U.S. PATENT DOCUMENTS 4,890,160 A * 12/1989 Thomas ................. H04N 5/145
348/429.1
4,989,087 A * 1/1991 Pele ..................... H04N 7/0157
348/416.1
(Continued)

FOREIGN PATENT DOCUMENTS

GB 2300538 A 11/1996
GB 2361126 A 10/2001
(Continued)

OTHER PUBLICATIONS

"Image Compression Algorithm" to M.S. Tamilselvi et al., ISSN: 2250-3021 of the IOSR Journal of Engineering of Jun. 2012.*
(Continued)

*Primary Examiner* — Dramos I Kalapodas
(74) *Attorney, Agent, or Firm* — Michael Best & Friedrich LLP (57) ABSTRACT

A method of analyzing an array of pixel-to-pixel dissimilarity values to identify a pixel which has a low pixel-to-pixel dissimilarity value and which has neighboring pixels which have a low pixel-to-pixel dissimilarity value; the method comprising filtering the pixel-to-pixel dissimilarity values and varying the spatial extent of the filter aperture in dependence upon a picture spatial activity measure.

15 Claims, 5 Drawing Sheets

(51) Int. Cl.
  *H04N 19/14* (2014.01)
  *H04N 19/182* (2014.01)
  *H04N 19/82* (2014.01)

(58) Field of Classification Search
  CPC . G06T 5/10; G06T 5/002; G06T 2207/20052; G06T 5/20; G06T 2207/20182; G06T 5/50; G06T 7/20; G02B 7/34; G02B 7/36; G03B 13/36
  See application file for complete search history.

(56) References Cited

U.S. PATENT DOCUMENTS

| | | | | |
|---|---|---|---|---|
| 5,481,628 A * | 1/1996 | Ghaderi | | G06T 5/20 382/261 |
| 5,576,767 A * | 11/1996 | Lee | | H04N 19/139 375/240.14 |
| 5,654,771 A * | 8/1997 | Tekalp | | H04N 19/54 348/699 |
| 5,764,307 A * | 6/1998 | Ozcelik | | H04N 5/21 348/607 |
| 5,784,114 A * | 7/1998 | Borer | | H04N 7/014 348/443 |
| 6,822,675 B2 * | 11/2004 | Jung | | H04N 17/004 348/180 |
| 6,920,252 B2 * | 7/2005 | Rouvellou | | H04N 19/80 375/E7.19 |
| 6,944,230 B2 * | 9/2005 | Babonneau | | H04N 19/51 375/240.26 |
| 6,999,630 B1 * | 2/2006 | Drouot | | G06T 9/00 348/606 |
| 7,034,892 B2 * | 4/2006 | Ojo | | G06T 5/20 348/607 |
| 7,085,401 B2 * | 8/2006 | Averbuch | | G06K 9/38 382/103 |
| 7,170,561 B2 * | 1/2007 | Winger | | H04N 7/012 348/441 |
| 7,345,708 B2 * | 3/2008 | Winger | | H04N 7/012 348/448 |
| 7,408,987 B1 * | 8/2008 | Chevance | | H04N 19/51 348/699 |
| 7,551,234 B2 * | 6/2009 | Zhou | | G06K 9/00765 348/700 |
| 7,659,939 B2 * | 2/2010 | Winger | | H04N 7/012 348/448 |
| 2002/0172431 A1 * | 11/2002 | Atkins | | G06T 9/007 382/240 |
| 2003/0011679 A1 * | 1/2003 | Jung | | H04N 17/004 348/181 |
| 2003/0185450 A1 * | 10/2003 | Garakani | | G06K 9/0014 382/232 |
| 2004/0145599 A1 * | 7/2004 | Taoka | | G09G 3/20 345/698 |
| 2005/0135698 A1 * | 6/2005 | Yatsenko | | G06T 5/002 382/260 |
| 2005/0276484 A1 * | 12/2005 | Chen | | G06K 9/6202 382/218 |
| 2006/0050783 A1 * | 3/2006 | Le Dinh | | H04N 5/208 375/240.2 |
| 2007/0074266 A1 * | 3/2007 | Raveendran | | H04N 5/144 725/135 |
| 2008/0062309 A1 * | 3/2008 | Zhai | | G06T 3/4084 348/452 |
| 2008/0101469 A1 * | 5/2008 | Ishtiaq | | G06T 5/002 375/240.13 |
| 2008/0137750 A1 * | 6/2008 | Burns | | H04N 7/014 375/240.19 |
| 2009/0168869 A1 * | 7/2009 | Melamed | | H04N 19/197 375/240.03 |
| 2009/0268981 A1 * | 10/2009 | Lu | | G06T 7/401 382/275 |
| 2011/0268179 A1 * | 11/2011 | Diggins | | H04N 5/145 375/240.02 |
| 2013/0329019 A1 * | 12/2013 | Matsuoka | | H04N 13/0217 348/49 |

FOREIGN PATENT DOCUMENTS

| | | |
|---|---|---|
| GB | 2495553 A | 4/2013 |
| GB | 2502047 A | 11/2013 |
| WO | 87/05769 A1 | 9/1987 |

OTHER PUBLICATIONS

United Kingdom Patent Application No. GB 1306340.9 Search Report, dated Oct. 8, 2013 (1 page).

\* cited by examiner

VIDEO SEQUENCE PROCESSING OF PIXEL-TO-PIXEL DISSIMILARITY VALUES

FIELD OF INVENTION

This invention concerns motion estimation of video signals.

BACKGROUND OF THE INVENTION

This invention concerns the estimation of motion vectors between video frames; and, in particular, the evaluation of the quality of motion vectors, or a motion vector field, produced by a motion measurement process.

In motion compensated image processing, motion vectors are assigned to pixels, or blocks of pixels, in each frame and describe the estimated displacement of each pixel or block in a next frame or a previous frame in the sequence. In the following description, the motion estimation is considered to be "dense" meaning that a motion vector is calculated for every pixel. The definition of "dense" may be widened to cover the calculation of a motion vector for each small block in the picture or for each pixel in a subsampled version of the picture. The invention can be applied with trivial modification to these wider cases.

Motion estimation has application in many image and video processing tasks, including video compression, motion compensated temporal interpolation for standards conversion or slow-motion synthesis, motion compensated noise reduction, object tracking, image segmentation, and, in the form of displacement estimation, stereoscopic 3D analysis and view synthesis from multiple cameras.

Figure 1:
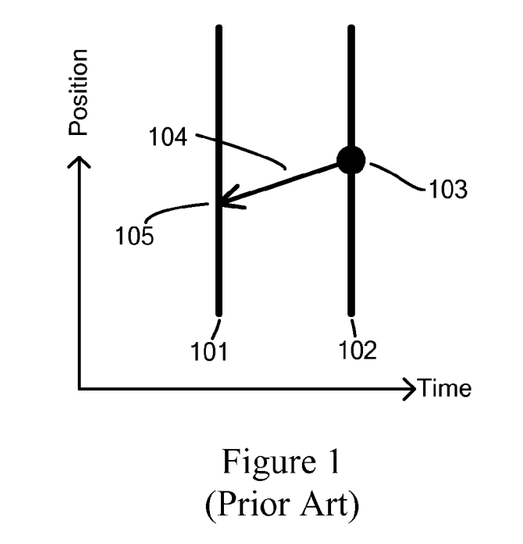
FIG. 1 is a diagram showing current and previous frames in an image sequence and a backward motion vector extending from a pixel in the current frame.

Some of the terminology used in describing motion estimation systems will now be described. FIG. 1 shows one-dimensional sections through two successive frames in a sequence of video frames, referred to as the previous or reference frame (101) and the current frame (102). A motion vector (104) is shown assigned to a pixel (103) in the current frame. The motion vector indicates a point (105) in the reference frame which is the estimated source of the current frame pixel (103) in the reference frame. This example shows a backward vector. Forward vectors may also be measured, in which case the reference frame is the next frame in the sequence rather than the previous frame.

An example of an algorithm that calculates motion vectors for pixels is given in WO 87/05769. The principle of this algorithm is summarised in FIG. 2. The current frame (201) and the previous frame (202) are applied to a phase correlation unit (203) which calculates a "menu" consisting of a number (three in this example) of candidate motion vectors (204). Each candidate vector controls a respective one of a set of shift units (205) which, for every pixel in the current frame, displaces the previous frame (202) by the respective candidate vector to produce a corresponding pixel in a set of displaced frames (206). Each displaced frame (206) is subtracted from the current frame and the resulting difference is rectified and spatially filtered in a respective member of a set of error calculation units (207) to produce a set of errors (208). The errors associated with each candidate vector are compared with each other in a comparison unit (209), which finds the minimum value error and the associated candidate index (210), which is applied to a vector selection unit (211) to select one of the candidate vectors (204) to produce a final 'assigned' output vector (212).

Figure 2:
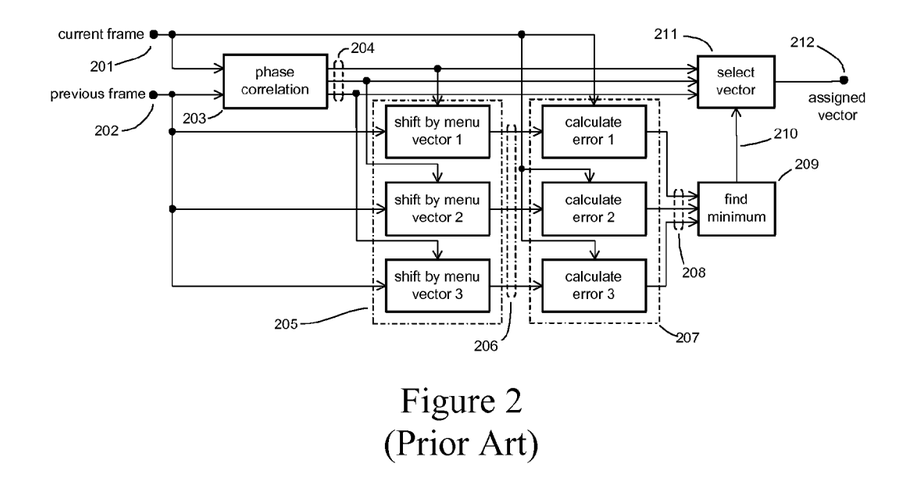
FIG. 2 is a block diagram of apparatus for assigning backward motion vectors to pixels according to the prior art.

In the cited example, the error calculation units (207) rectify the difference between a pixel in the current frame and a displaced pixel in the previous frame. This difference is known as the "displaced frame difference" or "DFD" for that pixel for the respective vector. The DFD is a measure of the 'quality' of the motion vector, or vector field, used to displace pixels. An important property of DFDs will now be described. If a candidate motion vector for a pixel describes the true motion of that pixel, then we would expect the DFD to be small, and only non-zero because of noise in the video sequence. If the candidate motion vector is incorrect, then the DFD may well be large, but it might be coincidentally small. For example, a rising waveform in one frame may match a falling waveform in the displaced frame at the point where they cross. Alternatively, a pixel may be in a plain area or in a one-dimensional edge, in which case several motion vectors would give rise to a small or even a zero DFD value. This inconvenient property of DFDs is sometimes referred to as the "aperture problem" and leads to the necessity of filtering the DFD in order to take information from nearby pixels into account.

Figure 3:
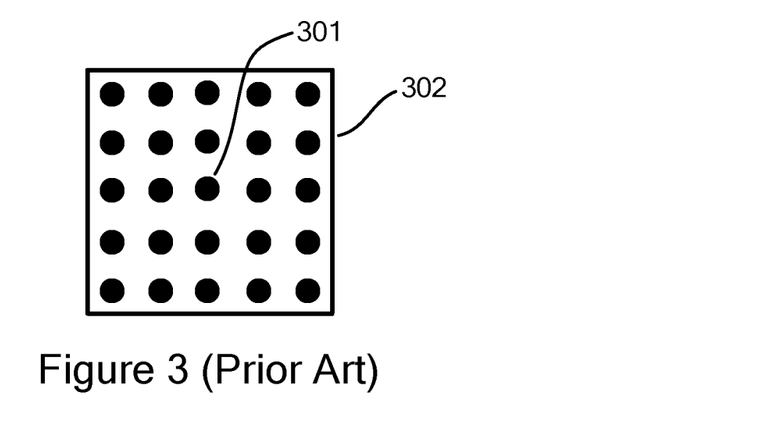
FIG. 3 is a diagram of a filter aperture according to the prior art.

In the example of FIG. 2, vectors are applied to blocks of pixels and each of the error calculation units (207) filters the respective DFD with a two-dimensional filter, a typical example of which is a 5×5 running-average filter. It is this rectified and filtered error that is used for comparison of candidate motion vectors. FIG. 3 illustrates the samples involved in the running-average filter. The set of 5×5 samples (302) is centred on the current pixel position (301).

Choosing the size of the two-dimensional error filter involves a trade-off between reliability and spatial accuracy of the resulting motion vector field created by selecting (allocating) vectors on the basis of the filtered errors. If, on the one hand, the filter is large, then the effect of noise on the filtered error is reduced and the filter is more likely to take into account nearby detail in the picture which might help to distinguish reliably between candidate motion vectors. However, a large filter is also more likely to take in pixel data from one or more objects whose motion is properly described by different motion vectors, in which case it will fail to give a low error for any candidate motion vector, even for one that is correct for the pixel in question.

If, on the other hand, the filter is small, it is more likely to involve pixels from only one object and so is more likely to return a low error for the correct motion vector. However, it will be less likely to reject wrong motion vectors and will be more susceptible to noise.

Our prior UK patent application GB 2502047 provides an improved displaced frame difference filter which combines the reliability and noise immunity of a large conventional filter with the sensitivity and spatial accuracy of a small filter, while avoiding the disadvantages of each. However, the choice of the size (extent) of the filter aperture remains problematic; for critical picture material, there is no choice of filter size which yields satisfactory performance in all aspects of reliability, noise immunity, spatial accuracy and sensitivity. There is thus a need for an improved DFD filter that provides a valid measure of the quality of a motion vector, or motion vector field, regardless of the character of the image being analysed.

SUMMARY OF THE INVENTION

The effectiveness of a DFD filter in discriminating between candidate motion vectors is highly dependent on the local information content or spatial activity of the picture. In areas of low spatial activity, a large filter will be required in order to capture sufficient information to discriminate between motion vectors. In areas of high spatial activity, a smaller filter will suffice and is desirable in order to minimize the danger that the filter's input will be contaminated with information from a different moving object.

The inventor has recognized that the problem of choosing the size of the filter aperture can be overcome by providing a DFD filter whose effective size depends on the local spatial activity of the picture.

The invention consists in a method and apparatus for video sequence processing, in which motion compensated pixel-to-pixel dissimilarity values are filtered and the spatial extent of the effective filter aperture is varied in dependence on a picture spatial activity measure.

Advantageously, the dissimilarity values are rectified displaced frame difference values.

In a first embodiment the outputs of two or more filters of pixel dissimilarity values are combined in dependence on a picture activity measure.

Suitably, the filters are two-dimensional linear filters.

Alternatively, the filters are running-average filters.

In a second embodiment picture activity values and dissimilarity values are separately accumulated within a common measurement window of increasing size, and the filter output is the accumulated dissimilarity value when the accumulated activity value reaches a threshold value.

Suitably, the contribution of pixels to the said accumulation of dissimilarity values depends on a candidate filter aperture.

Advantageously, accumulated dissimilarity values and accumulated activity values are calculated for a common measurement window comprising a non-integral number of pixels by interpolation between respective values derived from respective common measurement widows comprising integral number of pixels.

And, the filtered output is the interpolated dissimilarity value for which the interpolated activity value is equal to the said threshold.

In some embodiments the filter output is reduced in proportion to the number of pixels contributing to the accumulated dissimilarity value.

BRIEF DESCRIPTION OF THE DRAWINGS

An example of the invention will now be described with reference to the drawings in which.

DETAILED DESCRIPTION OF THE INVENTION

A DFD filter is used to improve the DFD value for a pixel by including information from nearby pixels. The filtered DFD arises from a candidate motion vector, or from a smoothly varying motion vector field, calculated by known methods and applied to a set of contiguous pixels. In the description that follows, the term "motion vector" refers either to a constant vector over a region or to a smoothly varying vector field. The DFD filters that will be described sum rectified pixel DFD values for pixels within a filter aperture. These sums of pixel DFD values can be weighted, in dependence upon the positions of the respective pixels relative to the pixel being evaluated, according to the known art of spatial filtering. However, typically, a 'running sum' of pixel DFD values is formed so that equal weight is given to all the pixels within the filter aperture.

A first displaced frame difference filter according to the invention will now be described.

Figure 4:
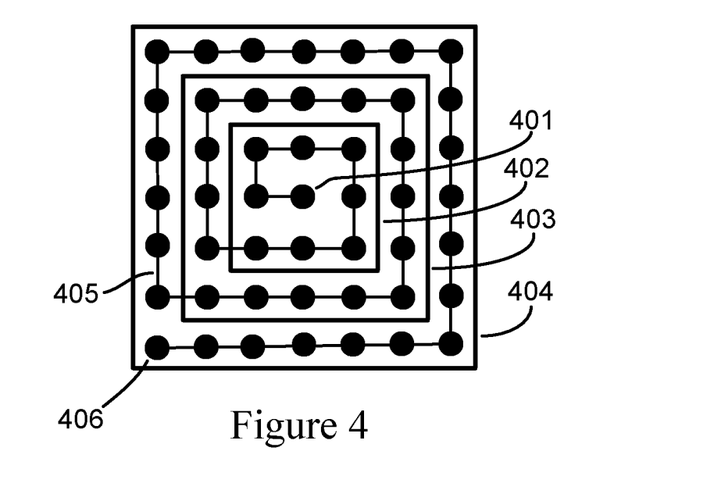
FIG. 4 is a diagram of a set of filter apertures according to a first version of the invention.

FIG. 4 shows three square filter apertures centred on a current pixel (401); this is the pixel with which the filter output will be associated. The smallest filter (402) has a 3×3 aperture, an intermediate filter (403) has a 5×5 aperture and the largest filter (404) has a 7×7 aperture. The three apertures are superimposed in the diagram, so that the aperture of each filter includes all the samples of the smaller apertures. The principle of the first embodiment of the invention is to filter the DFD using running-average filters based on all three apertures in parallel, and then to cross-fade (or switch) between them in dependence on a spatial activity measure. If the spatial activity is high, the final filtered output will be dominated by (or will comprise) the output of the small filter (402), whereas if the spatial activity is low the final filtered output will be dominated by (or will comprise) the output of the large filter (404).

Figure 5:
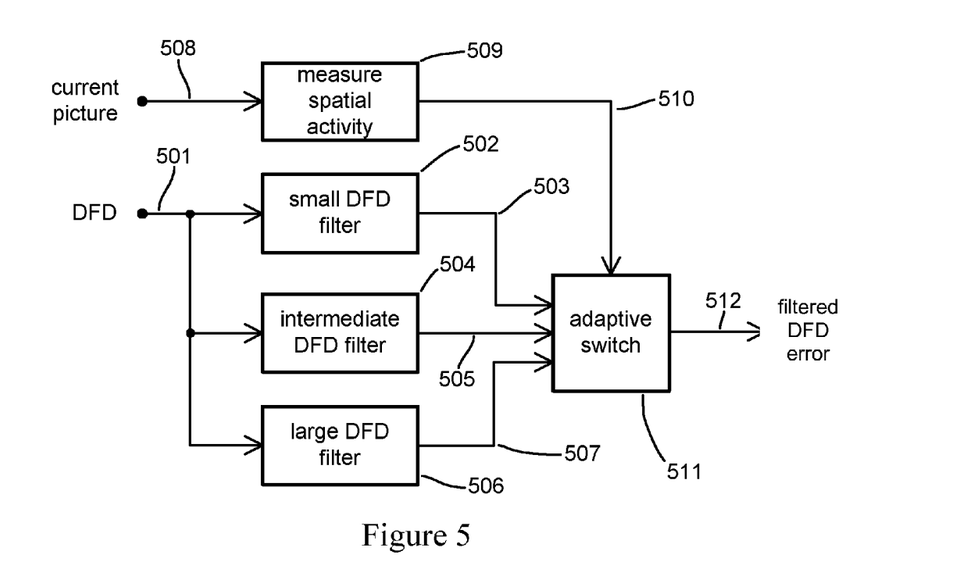
FIG. 5 is a block diagram of a filter according to a first version of the invention.

A more detailed description of the operation of the filter according to this first embodiment will now be given. Referring to FIG. 5, the incoming DFD (assumed to have been made positive by rectification) is applied in parallel to: a small DFD filter (502) to produce a small-filter output (503); to an intermediate DFD filter (504) to produce an intermediate-filter output (505); and, to a large DFD filter (506) to produce a large-filter output (507). Examples of suitable filter apertures were given in the preceding paragraph.

In synchronism with the DFD input (501), the current picture signal (508) is applied to a circuit (509) which measures spatial activity (510) in the vicinity of the current pixel. A suitable measure of spatial activity is the standard deviation σ of the pixels in a block centred on the current pixel; a suitable block size for this purpose is 5×5, corresponding to the intermediate DFD filter aperture.

The three filter outputs (503, 505 and 507) and the spatial activity measure (510) are applied to an adaptive switch (511) to produce a filtered DFD according to the invention. Examples of suitable adaptive switch functions will now be given.

An example of a "hard switch" function is:

$$d_{out} = \begin{cases} d_1 & \sigma > \tau_a \\ d_2 & \tau_a \geq \sigma > \tau_b \\ d_3 & \tau_b \geq \sigma \end{cases}$$

where $d_1$, $d_2$ and $d_3$ are the small, medium and large filter outputs respectively and $\tau_a$ and $\tau_b$ are constant spatial activity thresholds representing high and low activity respectively. Suitable values for $\tau_a$ and $\tau_b$ are 5 and 15 respectively in 8-bit grey-scale units.

An example of a "soft switch" function is:

$$d_{out} = \frac{d_1 e^{-\alpha(\sigma-\tau_1)^2} + d_2 e^{-\alpha(\sigma-\tau_2)^2} + d_3 e^{-\alpha(\sigma-\tau_3)^2}}{e^{-\alpha(\sigma-\tau_1)^2} + e^{-\alpha(\sigma-\tau_2)^2} + e^{-\alpha(\sigma-\tau_2)^2}}$$

where $d_1$, $d_2$ and $d_3$ the small, medium and large filter outputs respectively, $\tau_1$, $\tau_2$ and $\tau_3$ are corresponding constant representative spatial activity values, and $\alpha$ is a constant. Suitable values for $\tau_1$, $\tau_2$ and $\tau_3$ are 4, 8 and 20 respectively in 8-bit grey-scale units. A suitable value for $\alpha$ is 0.1.

Other configurations may also be used without departing from the scope of the invention. The number of filters is not restricted to three but could be two, four or a higher number. The DFD filters and spatial activity measure need not be based on square running-average filters but on low-pass filters of any shape. Spatial activity need not be based on standard deviation; it could also be calculated as the mean square or mean absolute output of a one or two-dimensional high-pass filter, or a sum of rectified difference-values between adjacent pixels or otherwise. More than one activity measure may be generated in parallel; for example, activity measures with three different block sizes may be generated and an appropriate one used in place of each occurrence of $\sigma$ in the soft switch formula given above. Other hard or soft switch functions may be used.

A second displaced frame difference filter according to the invention will now be described. In this second embodiment, DFD filtering and spatial activity calculations are carried out within a 'measurement window' of progressively increasing size, rather than with several, fixed sizes in parallel.

Figure 6:
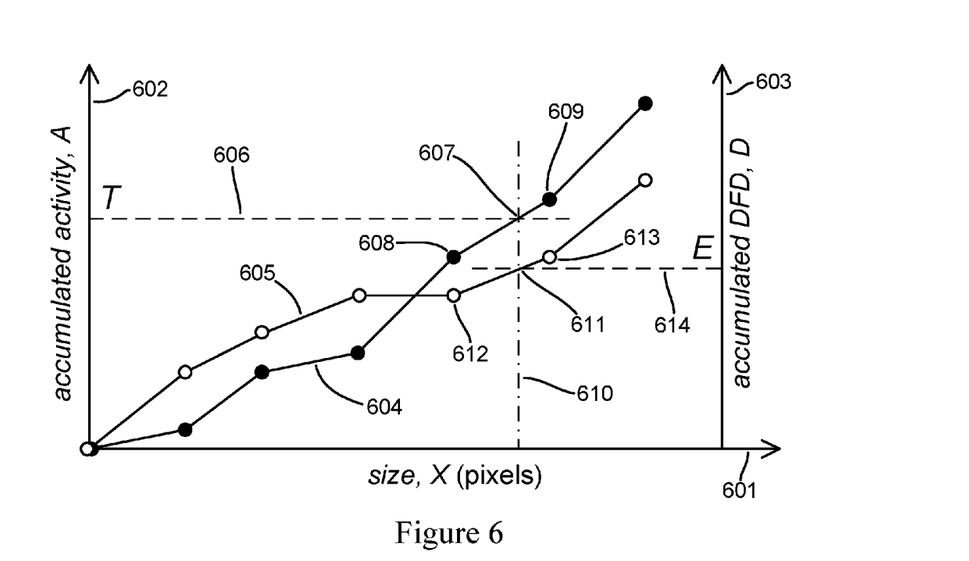
FIG. 6 is a diagram illustrating the principle of a second version of the invention.

We first describe the principle of this second filter according to the invention. Referring to FIG. 6, two graphs are plotted with a common X-axis (601) representing measurement window size X, where X is a number of pixels. The graph (604), having Y-axis (602) represents the accumulated spatial activity A for a window size X. The graph (605), having Y-axis (603) represents the accumulated pixel DFD value D for a window size X.

The two graphs are constructed by evaluating A and D for measurement windows of progressively increasing size, beginning with a one pixel window comprising only the current pixel, and adding additional, adjacent pixels one at a time. The accumulating activity values A are shown as the points on the increasing graph (604), and the accumulating DFD are the points on the increasing graph (605).

The increase in size of the measurement window may be effected by tracing a rectangular spiral pattern outwards from the current pixel, in steps of increasing outward distance, as indicated by the spiral track (405) in FIG. 4 leading from the current pixel (401) to a pixel (406) at some distance from it.

The principle of this embodiment of the invention is to interpret the accumulating activity (604) as a measure of the sufficiency of the picture material in the expanding measurement window to provide a DFD estimate that is reliable enough to distinguish between motion vectors. A threshold T (606) for the accumulating activity measure is set. When the accumulating activity A has passed the threshold value (606) and at least one more window size has been evaluated, the intercept (607) of the straight line joining the 'bracketing' points (608, 609), having values of A above and below the threshold value, is noted. The corresponding value (610) of the measurement window size X is calculated by linear interpolation between the X values of the bracketing points (608, 609). The intercept (611) of the interpolated X value with the straight line joining corresponding bracketed values (612, 613) of the accumulating DFD error E is noted, and the corresponding value of accumulating DFD E (614) is calculated by linear interpolation between the E values (612, 613). The interpolated E value (614) is the filter output.

A suitable value for T may be found by specifying a desired window size for use when the activity in that part of the picture is at some global average value. This average will depend on the method of spatial activity measurement used, however a suitable window size might be 5×5=25 pixels, and a typical global average activity might be 10, resulting in a threshold T=25×10=250.

Figure 7:
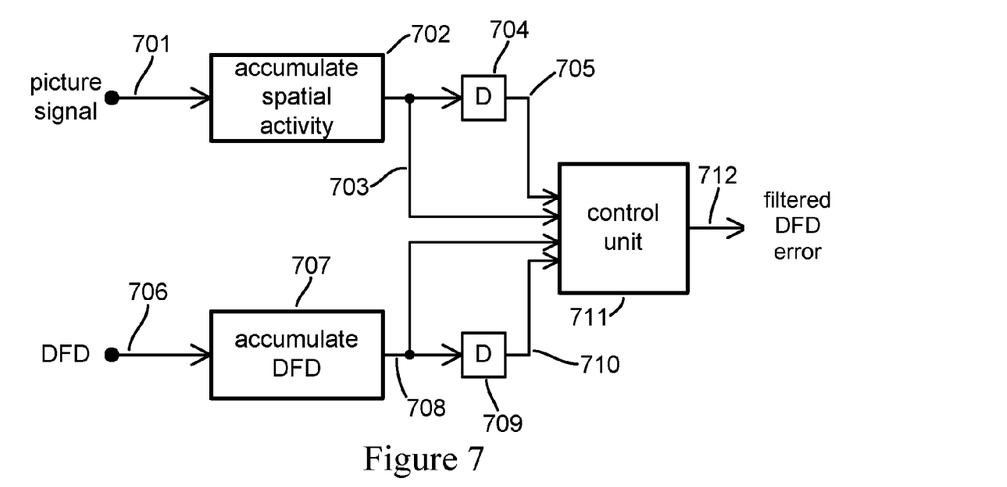
FIG. 7 is a block diagram of a filter according to a second version of the invention.

Further explanation of the second filter according to the invention will now be given with reference to a block diagram. Referring to FIG. 7, a picture signal (701) is applied to a circuit (702) which calculates an accumulating spatial activity measure (703), which is delayed (704) by one processing period or clock pulse to produce a delayed version (705). In synchronism with the picture signal, a rectified displaced frame difference signal (706) is applied to a circuit (707) which calculates an accumulating DFD value (708) which is also delayed (709) by one processing period or clock pulse to produce a delayed version (710). The two adjacent values of accumulating activity (703, 705) and of accumulating DFD (708, 710) are applied to a control unit (711) which calculates a final, filtered DFD-error value (712) according to the linear interpolation principles described above with reference to FIG. 6. Other interpolation algorithms, for example quadratic interpolation, may also be used.

Depending on the application to which the inventive filtered DFD value is put, the final filtered DFD-error value (712) may be used unscaled as a measure of vector or vector field quality. Or, it may be normalized according to the current filter aperture size to provide an average value that may be meaningfully compared with values derived from other DFD filters having different size.

Other filter apertures of increasing extent can be used, for example apertures comprising spatially-limited versions of those described in our prior patent application identified in the introduction. It is important to note that, although the extent of the filter aperture of this embodiment of the invention is limited to the extent of the measurement window, and all pixels within the measurement window contribute to the accumulated activity measure A, not all pixels within the measurement window need contribute to the accumulated DFD value D. This depends on the chosen 'candidate' filter aperture, as will be made clear in the following example.

Figure 8:
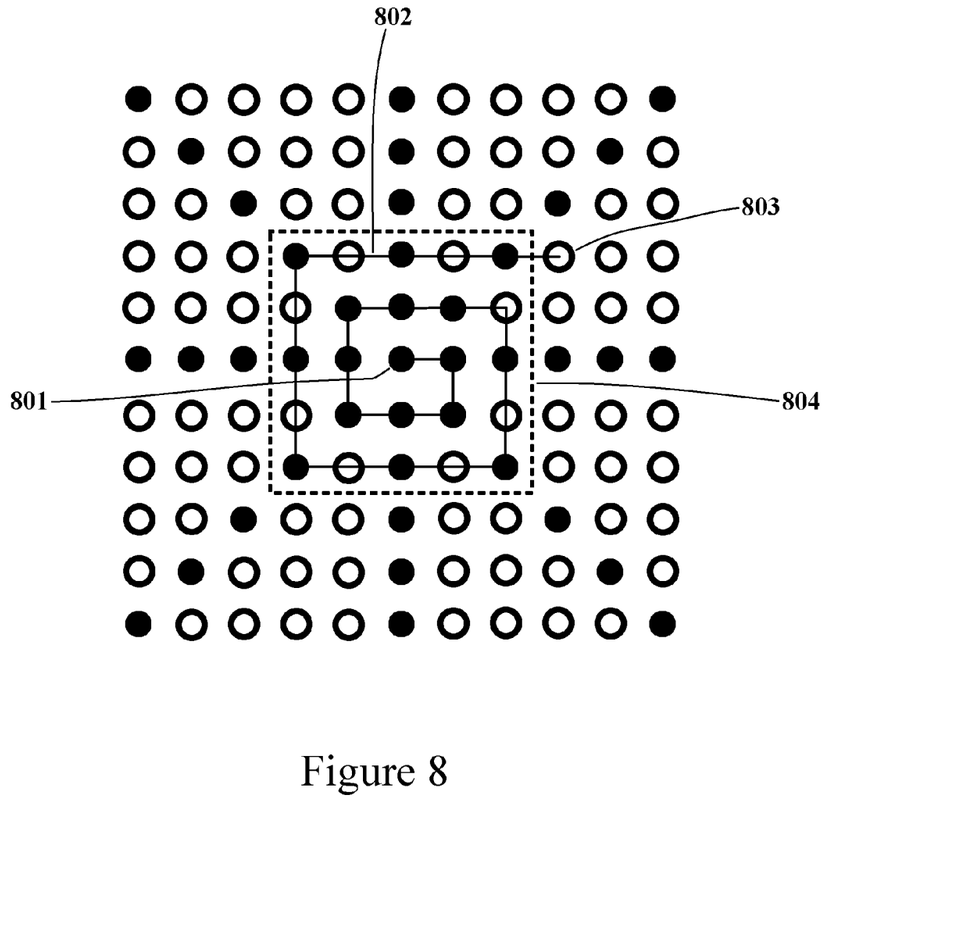
FIG. 8 is a diagram illustrating an alternative filter aperture according to an embodiment of the invention.

FIG. 8 shows an example in which the extent of a candidate filter aperture comprising 41 pixels within a rectangular 11×11 pixel image region is limited according to a spatial activity measure. The candidate filter aperture is formed of diagonal lines of pixels radiating out from the current pixel (801). The pixels forming the candidate aperture are shown in the Figure as black-filled circles, pixels not included in the candidate aperture are shown as unfilled circles. According to the known art of spatial filtering, the candidate aperture may allocate different weights to its constituent pixels, if so the contributions to the accumulating DFD value are weighted accordingly.

The accumulating measurement window follows the spiral track (802), starting with the current pixel (801) and proceeding via all the adjacent pixels, including those not forming part of the candidate filter aperture, to the pixel (803) where the activity threshold is exceeded. The extent of the actual filter aperture is determined by the distance of the pixel (803) from the current pixel (801). Only those pixels of the candidate aperture that are included in the spiral track (802) contribute to the filtered output. The filter aperture is thus limited, by the accumulated spatial activity measure, to the 18 pixels of the 41-pixel candidate aperture that fall within the rectangle (804). And, by means of the above-described interpolation between data values from successive measuring windows, the effective filter aperture may comprise a non-integral number of pixels.

In the invention, the calculation of the extent of the filter aperture from the accumulation of spatial activity within a measurement window is independent of the motion vector used for the DFD calculation. This has two benefits: one is that the processing involving spatial activity does not have to be duplicated when making DFD calculations for multiple candidate motion vectors, saving processing complexity and power; and, another benefit is that "like for like" comparisons can be made between accumulated DFD values because they are based on the same size of filter aperture.

The invention so far described is based on displaced frame differences. Other measures of pixel-to-pixel dissimilarity may also be used, including but not limited to: nonlinear functions of displaced frame difference, displaced frame differences between noise-reduced frames, Euclidean or other distances between multidimensional signals, for example RGB signals, and differences between feature point descriptors.

The above descriptions have assumed streaming processes related to real-time. The skilled person will realise that the invention can be applied in a non-inventive manner to non-real-time processes, to image date stored as files, and to processing in programmable devices.

The invention claimed is:

1. In a video processor, a method of analyzing an array of pixel-to-pixel dissimilarity values, representing dissimilarity between the pixels of a first image and the pixels of a second image, to identify a pixel which has a low pixel-to-pixel dissimilarity value and which has neighboring pixels which have a low pixel-to-pixel dissimilarity value; the method comprising the steps of:
    obtaining a picture spatial activity measure which is a measure of a spatial activity in the first image;
    filtering the pixel-to-pixel dissimilarity values with a filter having a filter aperture; and
    varying the spatial extent of the effective filter aperture in dependence upon said picture spatial activity measure,
    wherein the dissimilarity values are rectified displaced frame difference values, and
    wherein the outputs of two or more filters of pixel dissimilarity values are combined in dependence on a picture activity measure.

2. In a video processor, a method of analyzing an array of pixel-to-pixel dissimilarity values, representing dissimilarity between the pixels of a first image and the pixels of a second image, to identify a pixel which has a low pixel-to-pixel dissimilarity value and which has neighboring pixels which have a low pixel-to-pixel dissimilarity value; the method comprising the steps of:
    obtaining a picture spatial activity measure which is a measure of a spatial activity in the first image;
    filtering the pixel-to-pixel dissimilarity values with a filter having a filter aperture; and
    varying the spatial extent of the effective filter aperture in dependence upon said picture spatial activity measure, wherein the dissimilarity values are rectified displaced frame difference values, and wherein picture activity values and dissimilarity values are separately accumulated within a common measurement window of increasing size, and the filter output is the accumulated dissimilarity value when the accumulated activity value reaches a threshold value.

3. A method according to claim 2 in which the contribution of pixels to the said accumulation of dissimilarity values depends on a candidate filter aperture.

4. A method according to claim 2 in which accumulated dissimilarity values and accumulated activity values are calculated for a common measurement window comprising a non-integral number of pixels by interpolation between respective values derived from respective common measurement widows comprising integral number of pixels.

5. A method according to claim 4 in which the filtered output is the interpolated dissimilarity value for which the interpolated activity value is equal to the said threshold.

6. A method according to claim 1 in which the filter output is reduced in proportion to the number of pixels contributing to the accumulated dissimilarity value.

7. Video sequence processing apparatus for analyzing motion-compensated pixel-to-pixel dissimilarity values, the apparatus comprising:
    a spatial filter adapted to receive motion-compensated pixel-to-pixel dissimilarity values, the spatial filter having a variable effective filter aperture; and
    a picture spatial activity measurer adapted to receive a current picture and to provide a measure of spatial activity in the current picture;
    in which the spatial extent of the effective filter aperture is varied in dependence on said picture spatial activity measure;
    in which the dissimilarity values are rectified displaced frame difference values;
    in which said spatial filter comprises two or more filters and in which the spatial extent of the effective filter aperture is varied by combining the outputs of said two or more filters in dependence on the picture activity measure.

8. A non-transitory computer readable storage medium storing a computer program adapted to cause programmable apparatus to implement a method of analyzing an array of pixel-to-pixel dissimilarity values to identify a pixel which has a low pixel-to-pixel dissimilarity value and which has neighboring pixels which have a low pixel-to-pixel dissimilarity value; the method comprising the steps of obtaining a picture spatial activity measure by measuring spatial activity in a single image; filtering the pixel-to-pixel dissimilarity values with a filter having a filter aperture; and varying the spatial extent of the effective filter aperture in dependence upon said picture spatial activity measure, in which the dissimilarity values are rectified displaced frame difference values, in which the outputs of two or more filters of pixel dissimilarity values are combined in dependence on a picture activity measure.

9. A medium according to claim 8 in which picture activity values and dissimilarity values are separately accumulated within a common measurement window of increasing size, and the filter output is the accumulated dissimilarity value when the accumulated activity value reaches a threshold value.

10. A medium according to claim 9 in which the contribution of pixels to the said accumulation of dissimilarity values depends on a candidate filter aperture.

11. A medium according to claim 9 in which accumulated dissimilarity values and accumulated activity values are calculated for a common measurement window comprising a non-integral number of pixels by interpolation between respective values derived from respective common measurement widows comprising integral number of pixels.

12. A medium according to claim 11 in which the filtered output is the interpolated dissimilarity value for which the interpolated activity value is equal to the said threshold.

13. A medium according to claim 8 in which the filter output is reduced in proportion to the number of pixels contributing to the accumulated dissimilarity value.

14. A method according to claim 1 in which the spatial extent of the effective filter aperture is varied such that in areas of lower spatial activity, a larger filter aperture is employed and that in areas of higher spatial activity, a smaller filter aperture is employed.

15. A method according to claim 2 in which the spatial extent of the effective filter aperture is varied such that in areas of lower spatial activity, a larger filter aperture is employed and that in areas of higher spatial activity, a smaller filter aperture is employed.

* * * * *